US006725717B2

(12) United States Patent
Hiebert

(10) Patent No.: US 6,725,717 B2
(45) Date of Patent: Apr. 27, 2004

(54) NON-INTRUSIVE LOCATING OF A BLOCKAGE IN A PIPELINE

(76) Inventor: Leslie Dale Hiebert, 37 Camelot Avenue, Leduc, Alberta (CA), T9E 4L7

( * ) Notice: Subject to any disclaimer, the term of this patent is extended or adjusted under 35 U.S.C. 154(b) by 0 days.

(21) Appl. No.: 10/206,838

(22) Filed: Jul. 29, 2002

(65) Prior Publication Data

US 2003/0029252 A1 Feb. 13, 2003

Related U.S. Application Data

(60) Provisional application No. 60/311,091, filed on Aug. 10, 2001.

(51) Int. Cl.[7] .................................................. G01F 1/68

(52) U.S. Cl. .................................................. 73/204.26

(58) Field of Search ......................... 73/204.26, 861.71, 73/763, 768, 781, 861.42

(56) References Cited

U.S. PATENT DOCUMENTS 5,967,989 A * 10/1999 Cimochowski et al. ..... 600/459
6,354,147 B1 * 3/2002 Gysling et al. ............ 73/61.79
6,367,333 B1 * 4/2002 Bullister et al. .............. 73/715
6,536,291 B1 * 3/2003 Gysling et al. .......... 73/861.42

* cited by examiner

*Primary Examiner*—Edward Lefkowitz
*Assistant Examiner*—Corey D. Mack
(74) *Attorney, Agent, or Firm*—Adrian D. Battison; Michael R. Williams; Ryan W. Dupuis

(57) ABSTRACT

A blockage in a pipeline is detected by selecting a position on the pipeline between a supply position and a downstream receiving position where the blockage may be located, attaching a strain gauge to the pipeline at the selected position, applying pressure changes to product in the pipeline on one side of the blockage sufficient to cause strain changes in the pipeline, detecting by the strain gauge the presence of any strain changes in the pipeline at the selected position caused by the pressure changes and determining therefrom whether the blockage is upstream or downstream of the selected position.

8 Claims, 7 Drawing Sheets

NON-INTRUSIVE LOCATING OF A BLOCKAGE IN A PIPELINE

This application claims priority under 35 U.S.C.119 from Provisional Application 60/311,091 filed Aug. 10, 2001.

This invention relates to a method for the non-intrusive locating of a blockage in a pipeline which is particularly but not essentially related to locating a blockage caused by a stuck pig.

BACKGROUND OF THE INVENTION

Pipeline owners typically clean their pipelines by inserting "pigging devices" or "pigs" which travel with the product flow from launching points to receiving points. In most circumstances, the pigging devices fit tight into the pipelines, and are designed to push undesirable products (water, wax build-up) ahead of the pig where the products can be removed at the receiving points. There are several types of pigs; cleaning pigs, purging pigs, dummy tools and smart tool pigs, ball pigs, foam pigs, etc. and all of these can become blocked and form a blockage. In the case of gas pipeline systems, moisture/water can lead to ice plugs that form anywhere along the pipeline.

When pigs get stuck or ice plugs form, there is typically minimal or no product flow across the blockage. If pressuring/de-pressuring or circulation of solvents cannot dislodge the blockage, then the only recourse is to locate the blockage and attempt clearing at the site. In some cases, this means cutting out the section of pipeline with the blockage inside.

If pipeline owners experience a blockage which may be caused by a stuck pig in their pipeline, they must first locate it. Blockages caused by other problems such as ice dams may also be detected by this invention. Typically, this means excavating the pipeline at the half way point, then conducting a "hot tap" on the line to determine if there is line pressure. If pressure is observed, then this suggests that the blockage is downstream. Conversely, if little or no pressure is observed, then this indicates the blockage is upstream. This procedure has now halved the distance of pipeline where blockage is located, and the equipment is mobilized to the quarter point and the process is repeated.

Every time a hot tap is performed, it compromises the integrity of the pipeline. In essence, the owner cannot leave the hot tap in place and every hot tap requires a cut out and pipeline repair.

SUMMARY OF THE INVENTION

It is one object of the present invention, therefore, to provide an improved method of locating a blockage in a pipeline.

According to a first aspect of the invention, therefore, there is provided a method for detecting the location of a blockage in a pipeline comprising:

selecting a position on the pipeline between a supply position and a downstream receiving position where the blockage may be located;

attaching a strain gauge to the pipeline at the selected position;

applying pressure changes to fluid, that is liquid or gas, in the pipeline on one side of the blockage sufficient to cause strain changes in the pipeline on said one side of the blockage with no corresponding strain changes in the pipeline on the other side of the blockage;

detecting by the strain gauge the presence of any strain changes in the pipeline at the selected position caused by the pressure changes and determining therefrom whether the blockage is upstream or downstream of the selected position.

Normally, although not essentially, the pressure changes will be applied upstream of the selected site at the supply position. Normally, although not essentially, the blockage is of the type caused by the blocking of the movement of a pig, but the method may be used for detecting any blockage, which may be a total blockage or may be a severe restriction which does not totally block flow but which generates a sufficiently demarcated restriction so that the pressure differences are not communicated across the blockage. In such a case, the supply position and receiving position are those used for the feeding and receiving of the pig in the pipeline operation.

Preferably the strain gauge is of the type conventionally known as a "bonded resistance strain gauge" which comprises a foil or wafer which is intimately attached to an outside surface of the pipeline. Such a strain gauge is of a type which uses a thin metal conductive film the resistance of which changes as it is stretched. Other types of strain gauge may also be used including piezoelectric, semiconductor, carbon resistive, bonded metallic wire, and foil resistance. The first three of these could be considered "non metallic". The choice of the device is however preferably one which can respond to changes which occur over an extended period for example several minutes to several hours and is not limited to short term or vibration type changes. Piezo electric devices are less suitable because they are not responsive to such long term changes and thus respond to changes over terms of the order of seconds or less and it is impractical in many situations to cycle the pressure at periods to which piezo devices might respond.

Uni-axial gauges as well as tri-axial or rosette gauges could be used. Selection of gauge and its orientation on the pipe will be based on pipe size, wall thickness, Maximum Allowed Operating Pressure (MAOP), expected strain relative to the ability to change pipe pressure in a timely manner.

MAOP is Energy and Utilities Board regulated. A pipeline may be licensed for a certain MAOP, but its normal operating pressure could be substantially lower. As well, during testing or pressuring to remove a blockage in a licensed pipeline in Alberta, owners are allowed to exceed MAOP by 10%, but only for these purposes.

Conductive film devices of this type which are suitable for the present invention are available from Omega Canada Inc. of Toronto, Canada. This is a Foil strain gauge SG-7/350-LY11. This is a uni-axial gauge with an active grid length of 7 millimeters with a 350 ohm bridge resistance, compensated for steel application. Longer available gauges could also be used, and certainly there are ones that have been compensated for pipe materials other than steel. But different gauges can be selected pending the service (i.e. pipe material, diameter, maximum operating pressure of pipeline (MAOP) and expected cyclic pressure changes over reasonable time frames), using the same the principle described herein.

Devices of this type are available which are disposable or one time use devices and such devices can be simply bonded to the pipe by a layer of adhesive and either left in place or removed and discarded.

Preferably an exterior coating of the pipe line is removed for the intimate attachment and the coating is replaced after removal of the device.

However the device may also be used with hardware designed to be attached to the pipe and removable from the pipe where the hardware carries the strain gauge and attaches it to the pipe in a manner which communicates the strain from the pipe to the gauge itself. Such devices are available and are known as an "Extensometer".

The strain gauge may have two outputs at right angles arranged longitudinally and transversely of the pipeline. If this is used, the main measurement is made in the transverse or circumferential direction where expansion of the pipe occurs due to the increased pressure and the longitudinal measurement is used to detect changes due to temperature differences and to provide a value which can be used in compensation for temperature changes in the circumferential value. In the alternative, a single direction strain gauge can be used without compensation.

The pressure impulse applied are selected so that the maximum pressure difference is obtained bearing in mind the maximum allowable pressure (MAOP) for the pipe and bearing in mind the requirement that the pressure reach the blockage within a reasonable time period. The time to reach the blockage may take several minutes or even longer depending upon the distance and the characteristics of the material within the pipe. Longer time periods are undesirable in view of the extended testing period required.

Pressurisation of the pipe can be effected by using the conventional pump if available at the location concerned. If not, conventional pressure trucks can be used. When the pressure is released, the liquid discharged can be directed to the sump if available. If not, conventional vacuum trucks can be used to remove the excess liquid.

The non-intrusive locating system disclosed herein aids pipeline owners in locating the blockages. By using very sensitive but readily available "bonded resistance strain gauges", it can determine if there are pressure changes in the pipeline, thereby indicating whether there is blockage upstream or downstream of the test site.

BRIEF DESCRIPTION OF THE DRAWINGS

Embodiments of the invention will now be described in conjunction with the accompanying drawings, in which.

DETAILED DESCRIPTION

Any pipe that is put under normal allowable operating pressure will undergo elastic micro strain. That is, the pipe will circumferentially stretch according to internal pressure. When pressure is removed, the pipe will return to its normal size.

Strain gauges and technology are able to detect and accurately measure micro strain. A typical use of strain gauges is for load cells on cranes. The micro-elastic stretch of a load cell is directly proportional to the load weight that a crane is lifting. Hence, strain and load are proportional.

By applying strain gauges to the outside of a pipeline and cycling pipeline pressure, the gauge will detect the change in pipe pressure by detecting pipe strain. This will indicate whether the blockage is upstream or downstream.

Once the direction of the blockage has been ascertained, that is whether the strain gauge is upstream or downstream of the blockage, the gauge can be removed from the outside of the pipeline and the pipeline's external coating repaired (if necessary). The integrity of the pipeline has not been compromised as holes or taps have not been introduced. Hence, this process is referred to as "non intrusive".

The strain gauge instrument associated with the strain gauge is able to power and read strain gauge foils. As is well known, the operation of this device is based upon Wheatstone Bridge Circuit. The strain gauges are typically of the "bonded resistance strain gauge" type and can apply to either non-metallic or metallic gauges.

In a section of 3" line pipe and 3" schedule 40 pipe it has been proven that 1 the instrument is able to detect small changes in pipeline pressure relative to typical pipeline operating pressures (about 1/20t' to 1/10t' of typical operating pressures).

Figure 1:
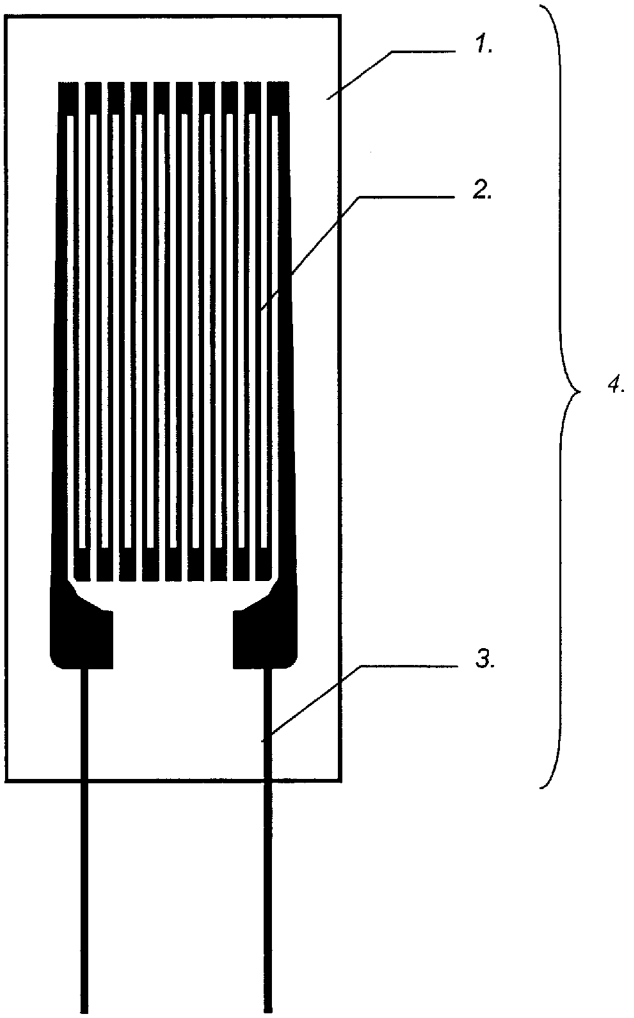
FIG. 1 is a top plan view of a strain gauge for attachment to the exterior surface of a pipeline in a method according to the present invention.
Figure 2:
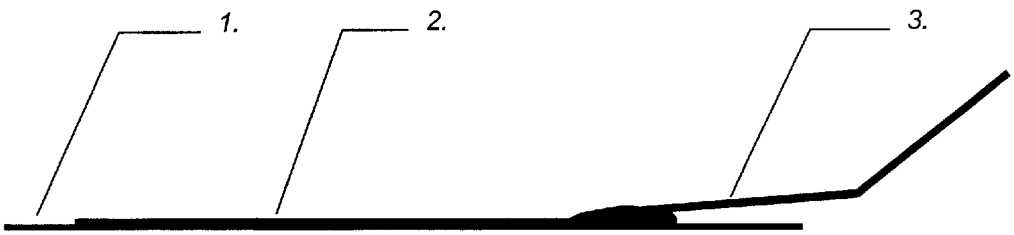
FIG. 2 is a side elevational view of the strain gauge of FIG. 1.

In FIGS. 1 and 2 is shown a typical bonded resistance strain gauge generally indicated at 4 which includes a carrier matrix 1, a grid of fine wire or foil 2 that changes its electrical resistance when elongated in a direction at right angles to the wires together with lead wires 3 that connect to the strain gauge measuring instrument.

Figure 3:
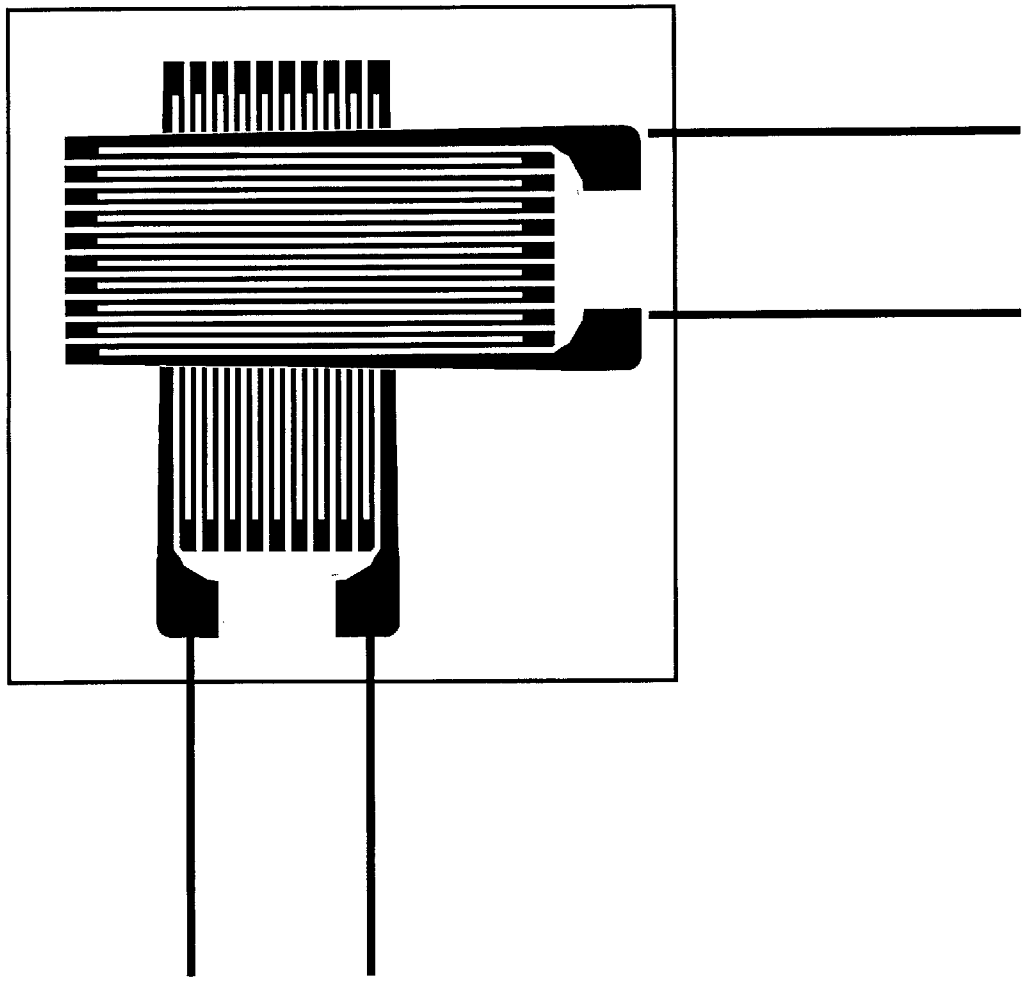
FIG. 3 is a top plan view of a bi-axial bonded resistance strain gauge for attachment to the exterior surface of a pipeline in a method according to the present invention.

In FIG. 3 is shown an array including two of the strain gauges of FIG. 1 arranged at right angles so as to provide measurement of expansion in two orthogonal directions.

Figure 4:
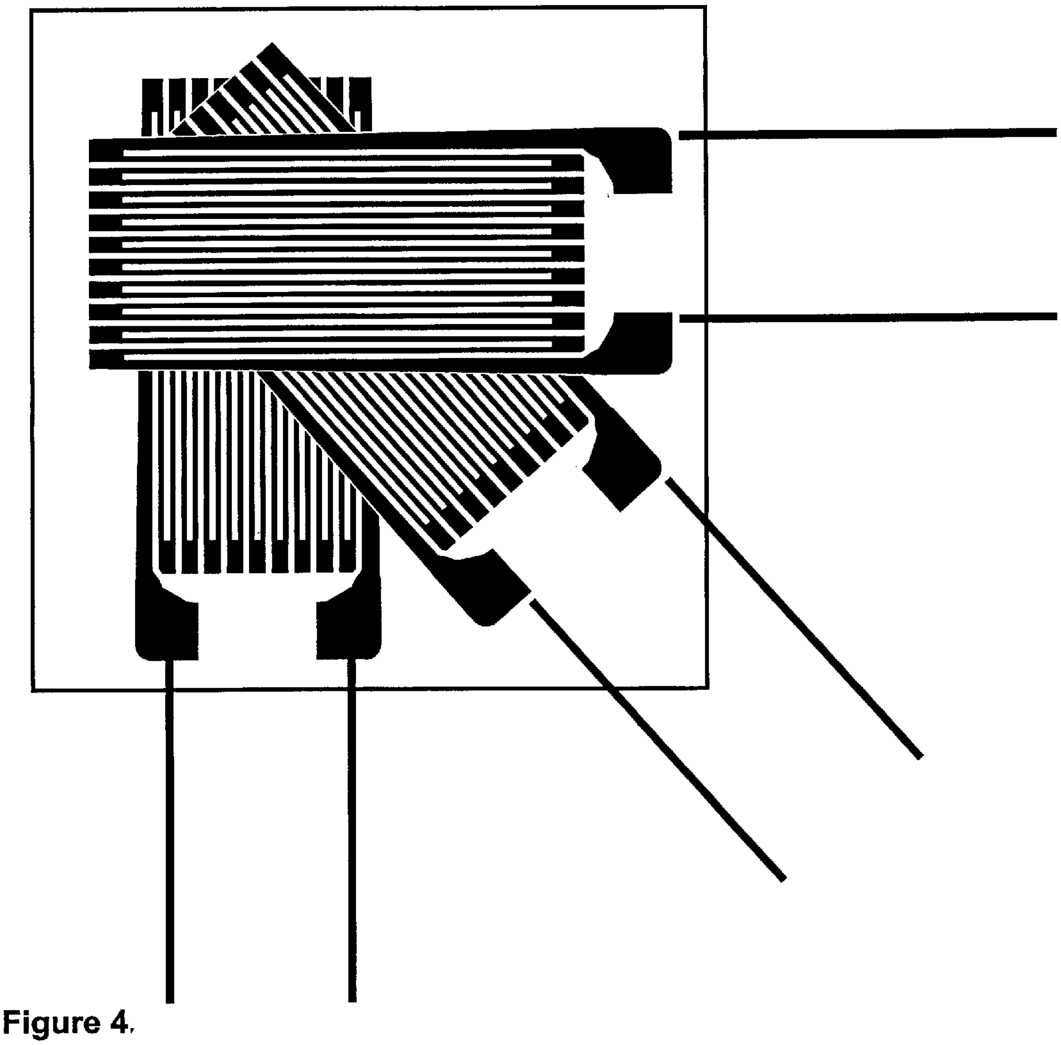
FIG. 4 is a top plan view of a tri-axial (rosette) bonded resistance strain gauge for attachment to the exterior surface of a pipeline in a method according to the present invention.

In FIG. 4 is shown a further arrangement with three strain gauges arranged at 45 degrees so as to provide measurement in the three directions of expansion.

Figure 5:
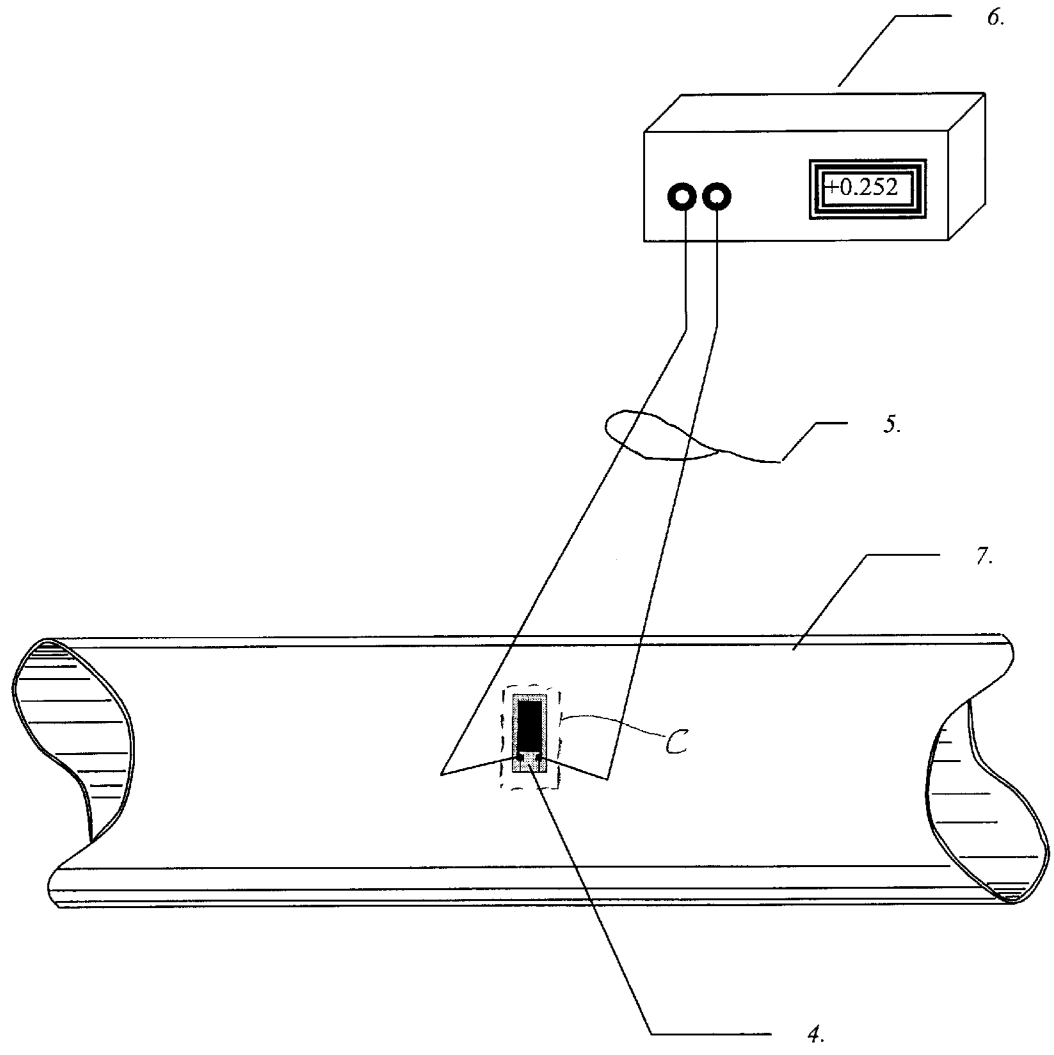
FIG. 5 is a side elevational view of a strain gauge attached to the pipeline in the method of the present invention.

In FIG. 5 is shown the resistance strain gauge 4 bonded onto the exterior of a pipe 7. A portion of the coating covering the pipe can be removed as indicated at C allowing the strain gauge to be applied directly onto the exterior of the pipe. The wires 3 from the strain gauge are connected through leads 5 to the monitoring device 6. The monitoring device comprises a self powered arrangement for excitation and monitoring of the changes in voltage in the strain gauge 4.

Figure 6:
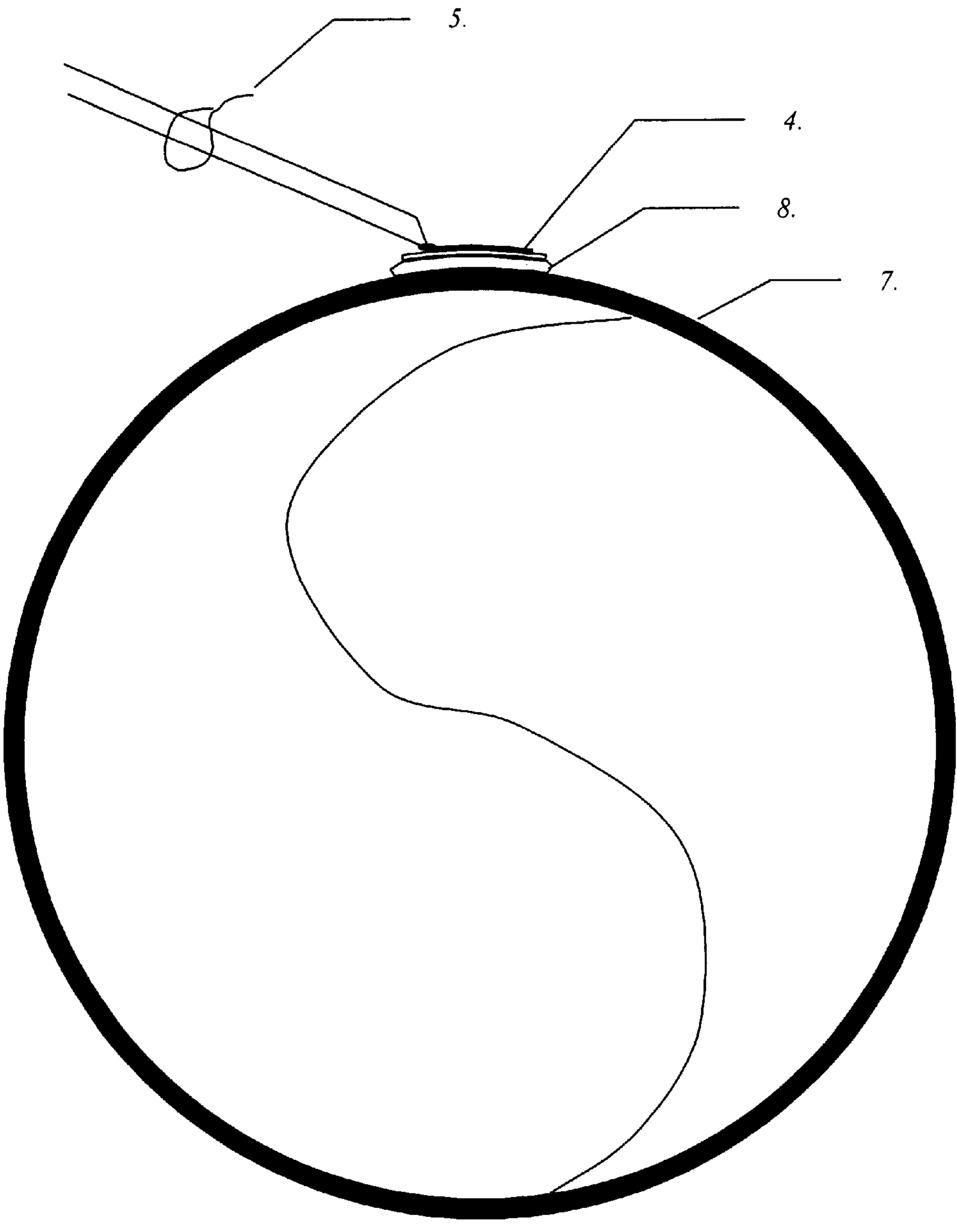
FIG. 6 is a transverse cross-sectional view of the strain gauge attached to the pipeline of FIG. 5 in the method of the present invention.

In FIG. 6 the arrangement is shown in cross section where the adhesive 8 is used to bond the gauge matrix 1 to the exterior of the pipe.

Figure 7:
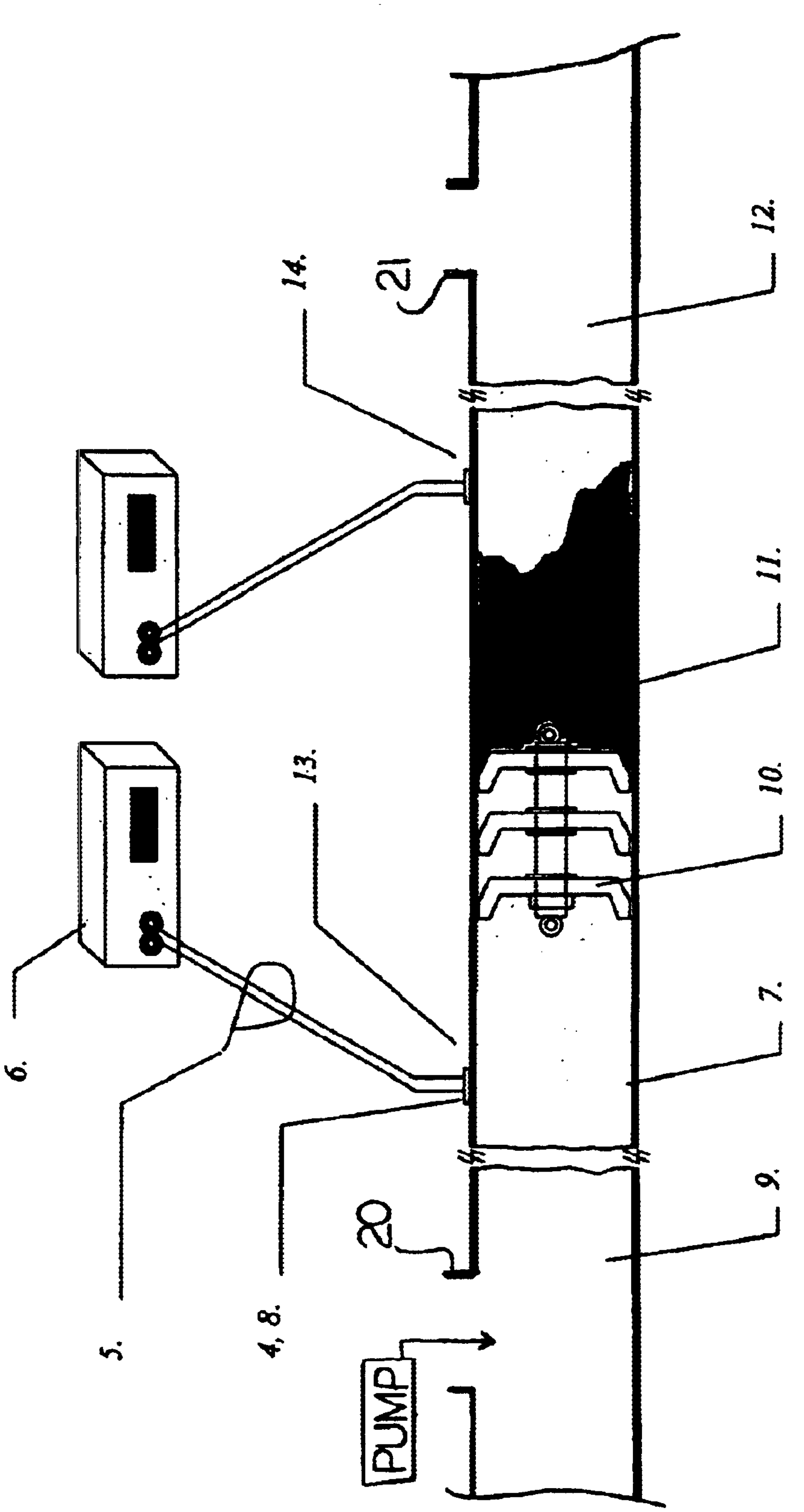
FIG. 7 is a longitudinal cross-sectional view of two strain gauges attached to the pipeline of FIG. 5 in the method of the present invention.
Figure 8:
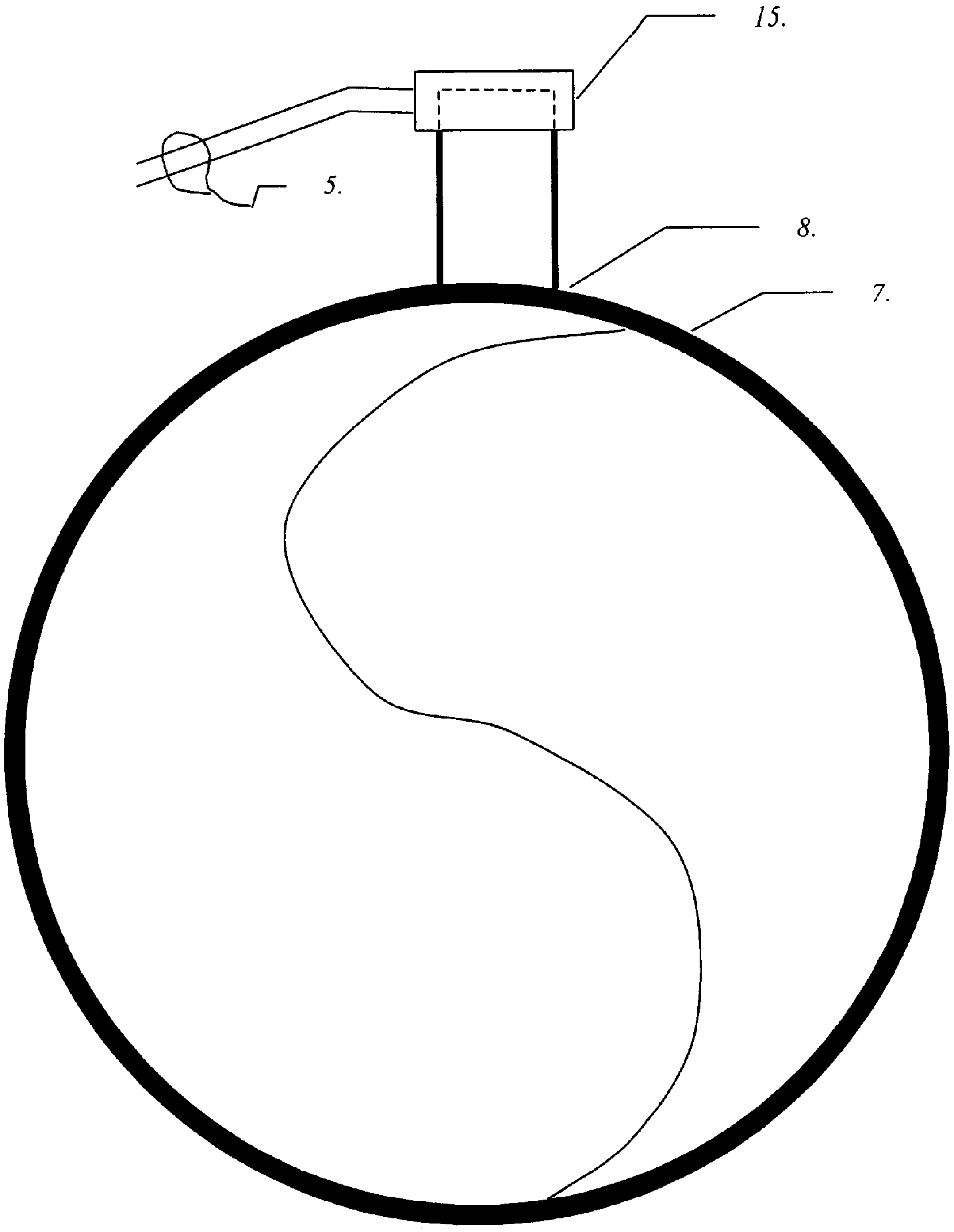
FIG. 8 is a transverse cross-sectional view of an extensometer attached to the pipeline of FIG. 5 in the method of the present invention.

In FIG. 7 is shown an arrangement in which flow in the pipeline has become obstructed resulting in a stuck pig 10 which is in engagement with a blockage or pipeline contents 11. Thus the blockage is formed by a combination of the stuck pig and the contents within the pipe. Pressures in the pipeline on an upstream side 9 of the blockage can be increased or lowered but do not readily transmit or do not transmit at all to the down stream side 12 of the blockage. Consequently a pressure differential occurs across the blockage provided by the pig 10 at the contents 11. The pipeline 7 includes a first access location 20 upstream of the blockage and a second access location 21 downstream of the blockage. In many cases these access locations are used for insertion of a pig into the pipeline and for recovery of the pig from the pipeline downstream of a length of the pipeline to the cleaned or otherwise acted upon by the passing pig. It is of course apparent that the blockage or restriction has occurred between the access opening 20 and the access opening 21 rendering the pig stuck in the pipe line at the blocked or stationary contents 11. The presence of the pig can intensify the blockage thus increasing the pressure differential across the blockage.

A first strain gauge is applied at a location 13 and a second strain gauge is applied at a location 14, each having associated its own control unit 6. Pressure changes are applied at the access opening 20 by application of pressure either from the pipeline pump or from a portable pumping unit so that the pressure within the pipeline from the access opening 20 to the pig 10 is increased over a period of time as set forth above.

Since pipeline pressure and pipe strain are directly related, the strain gauge at the location 13 is responsive to the pipe strain to show the increase in pressure. The strain gauge at the location 14 however is not expanded by the pipe strain since it is downstream of the blockage. Thus the blockage is located between the locations 13 and 14. This process can be implemented as often as required with any pipe distance between the locations 13 and 14 until the specific location of the blockage is positioned within an acceptable pipe length.

This process does not require temperatures or procedures that compromise or invade the pressured pipeline. Welding, sleeving and hot tapping processes are not required, thus reducing the risk of personal injury, property damage or release of pipeline contents into the environment.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method for detecting the location of a blockage in a pipeline comprising:

providing a pipeline having a fluid therein for transmission along the pipeline;

detecting presence of a blockage in the pipeline, between a supply position and a downstream receiving position, acting to at least restrict flow of the fluid through the pipeline;

selecting a position on the pipeline between the supply position and the downstream receiving position;

attaching a strain gauge to the pipeline at the selected position;

applying pressure changes to the fluid in the pipeline on one side of the blockage sufficient to cause the presence of corresponding strain changes in the pipeline on said one side of the blockage with the blockage causing the absence of corresponding strain changes in the pipeline on the other side of the blockage;

detecting by the strain gauge the presence of any strain changes in the pipeline at the selected position caused by the pressure changes;

and determining from the presence of corresponding strain changes that the blockage is on said one side of the selected position;

and determining from the absence of corresponding strain changes that the blockage is on said other side of the selected position.

2. The method according to claim 1 wherein the strain gauge is intimately attached to an outside surface of the pipeline.

3. The method according to claim 2 wherein an exterior coating of the pipe line is removed or the intimate attachment and the coating is replaced after removal.

4. The method according to claim 2 wherein the strain gauge is bonded to the outside surface.

5. The method according to claim 2 wherein the strain gauge comprises a foil.

6. The method according to claim 2 wherein the strain gauge comprises a piezo-electric wafer one side of which is bonded to the outside of the pipeline.

7. The method according to claim 2 wherein the strain gauge has two outputs at right angles arranged longitudinally and transversely of the pipeline.

8. The method according to claim 7 wherein the main measurement is made in the transverse or circumferential direction where expansion of the pipe occurs due to the increased pressure and the longitudinal measurement is used to detect changes due to temperature differences and to provide a value which can be used in compensation for temperature changes in the circumferential value.

* * * * *